United States Patent
George et al.

(10) Patent No.: US 9,830,240 B2
(45) Date of Patent: Nov. 28, 2017

(54) SMART STORAGE RECOVERY IN A DISTRIBUTED STORAGE SYSTEM

(71) Applicant: CISCO TECHNOLOGY, INC., San Jose, CA (US)

(72) Inventors: Johnu George, San Jose, CA (US); Marc Solanas Tarre, San Jose, CA (US); Kai Zhang, San Jose, CA (US); Yathiraj B. Udupi, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 183 days.

(21) Appl. No.: 14/712,762

(22) Filed: May 14, 2015

(65) Prior Publication Data

US 2016/0335166 A1    Nov. 17, 2016

(51) Int. Cl.
  *G06F 11/00* (2006.01)
  *G06F 11/20* (2006.01)
  *G06F 3/06* (2006.01)

(52) U.S. Cl.
  CPC .......... *G06F 11/2094* (2013.01); *G06F 3/067* (2013.01); *G06F 3/0619* (2013.01); *G06F 3/0647* (2013.01); *G06F 11/00* (2013.01)

(58) Field of Classification Search
  CPC ........................ G06F 11/2094; G06F 11/3409
  See application file for complete search history.

(56) References Cited

U.S. PATENT DOCUMENTS

| | | | |
|---|---|---|---|
| 7,266,718 B2* | 9/2007 | Idei | G06F 11/2076 714/6.31 |
| 7,447,839 B2 | 11/2008 | Uppala | |
| 7,587,570 B2* | 9/2009 | Sarkar | G06F 3/0605 711/170 |
| 7,657,796 B1* | 2/2010 | Kaiser | G06F 11/1435 707/821 |
| 7,694,092 B2* | 4/2010 | Mizuno | G06F 11/1469 707/640 |
| 8,341,121 B1* | 12/2012 | Claudatos | G06F 17/30289 707/640 |
| 8,630,983 B2 | 1/2014 | Sengupta et al. | |

(Continued)

OTHER PUBLICATIONS

Lampson, et al., "Crash Recovery in a Distributed Data Storage System," Jun. 1, 1979, 28 pages; http://web.cs.wpi.edu/~cs502/cisco11/Papers/LampsonSturgis_Crash%20recovery_later.pdf.

(Continued)

*Primary Examiner* — Elmira Mehrmanesh
(74) *Attorney, Agent, or Firm* — Polsinelli PC

(57) ABSTRACT

Embodiments include obtaining at least one system metric of a distributed storage system, generating one or more recovery parameters based on the at least one system metric, identifying at least one policy associated with data stored in a storage node of a plurality of storage nodes in the distributed storage system, and generating a recovery plan for the data based on the one or more recovery parameters and the at least one policy. In more specific embodiments, the recovery plan includes a recovery order for recovering the data. Further embodiments include initiating a recovery process to copy replicas of the data from a second storage node to a new storage node, wherein the replicas of the data are copied according to the recovery order indicated in the recovery plan.

18 Claims, 3 Drawing Sheets

(56) References Cited

U.S. PATENT DOCUMENTS

| | | | |
|---|---|---|---|
| 9,003,086 B1* | 4/2015 | Schuller | G06F 3/0613 |
| | | | 709/226 |
| 9,264,494 B2* | 2/2016 | Factor | H04L 67/1097 |
| 9,304,815 B1* | 4/2016 | Vasanth | G06F 9/4881 |
| 2007/0101202 A1* | 5/2007 | Garbow | G06F 11/008 |
| | | | 714/47.2 |
| 2007/0136541 A1* | 6/2007 | Herz | G06F 11/1464 |
| | | | 711/162 |
| 2010/0318837 A1* | 12/2010 | Murphy | G06F 11/1461 |
| | | | 714/4.1 |
| 2011/0313973 A1 | 12/2011 | Srivas et al. | |
| 2013/0061089 A1 | 3/2013 | Valiyaparambil et al. | |
| 2013/0080823 A1* | 3/2013 | Roth | G06F 11/2023 |
| | | | 714/4.1 |
| 2014/0215265 A1 | 7/2014 | Mohanta et al. | |
| 2014/0281700 A1 | 9/2014 | Nagesharao et al. | |
| 2015/0067001 A1 | 3/2015 | Koltsidas | |
| 2015/0121131 A1 | 4/2015 | Kiselev | |

OTHER PUBLICATIONS

Hu, et al., "Cooperative Recovery of Distributed Storage Systems from Multiple Losses with Network Coding," University of Science & Technology of China, Feb. 2010, 7 pages http://vc.cs.nthu.edu.tw/home/paper/codfiles/cmli/201311180306/Cooperative%20Recovery%20of%20Distributed%20Storage%20Systems%20from%20Multiple%20Losses%20with%20Network%20Coding.pdf.

Zhu, et al., "A Cost-based Heterogeneous Recovery Scheme for Distributed Storage Systems with RAID-6 Codes," University of Science & Technology of China, 12 pages; http://www.cse.cuhk.edu.hk/~pclee/www/pubs/dsn12.pdf.

Sage A. Weil, "Ceph: Reliable, Scalable, and High-Performance Distributed Storage," University of California, Santa Cruz, Dec. 2007, 239 pages, on the Cisco Catalyst 4500 Classic Supervisor Engines, http://ceph.com/papers/weil-thesis.pdf.

* cited by examiner

SMART STORAGE RECOVERY IN A DISTRIBUTED STORAGE SYSTEM

TECHNICAL FIELD

This disclosure relates in general to the field of data storage and, in particular, to smart storage recovery in a distributed storage system in a network environment.

BACKGROUND

In recent years, cloud-based storage has emerged to offer a solution for storing, accessing, and managing electronic data owned or controlled by various types of private and public entities. Distributed storage systems may offer a storage platform designed to provide object based, block based, and file based storage from a single distributed storage cluster in a cloud. A distributed storage cluster may contain numerous nodes for storing objects and other data. Generally, a distributed storage system is designed to evenly distribute data across the cluster. Multiple replicas of data can be maintained according to a replication factor in order to provide fault tolerance and high availability to users, applications, and other systems. When node failure occurs in a cluster, replicas may be copied to new nodes to maintain the replication factor in the cluster.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION

Overview

The present disclosure describes a recovery system for a distributed storage system. A method is provided in one example of the present disclosure and includes obtaining at least one system metric of a distributed storage system, generating one or more recovery parameters based on the at least one system metric, identifying at least one policy associated with data stored in a storage node of a plurality of storage nodes in the distributed storage system, and generating a recovery plan for the data based on the one or more recovery parameters and the at least one policy.

In specific embodiments, the at least one system metric includes information related to at least one of on-going client operations, current central processing unit (CPU) utilization, disk usage, available network bandwidth, remaining disk input/output operations per second (IOPS), and remaining disk bandwidth. In further specific embodiments, the at least one system metric is pushed, in real-time, to a recovery system from at least one storage node of the plurality of storage nodes in the distributed storage system.

In some embodiments, the method includes monitoring the plurality of storage nodes in the distributed storage system for an indication of failure. The recovery plan can be generated for the data after a failure of the storage node is detected. Alternatively, in some embodiments, the method includes monitoring the plurality of storage nodes in the distributed storage system for an indication of impending failure. In this scenario, the recovery plan can be generated for the data before a failure of the storage node is detected.

In some embodiments, the recovery plan includes a recovery order for recovering the data. The method may further include initiating a recovery process to copy replicas of the data from one or more other storage nodes to a new storage node. The replicas can be copied according to the recovery order indicated in the recovery plan.

In some embodiments, a first subset of the data associated with a first policy can be recovered before a second subset of the data associated with a second policy, where the first policy indicates a higher priority than the second policy. In some embodiments, the recovery plan can recover a first subset of the data before a second subset of the data if the first subset of the data is associated with a smaller replication factor than the second subset of the data.

Some or all of the elements, operations, and features may be included in respective systems, apparatuses, and devices for performing the described functionality. Furthermore, some or all of the features may be implemented in at least one machine readable storage medium.

DESCRIPTION OF EMBODIMENTS

Figure 1:
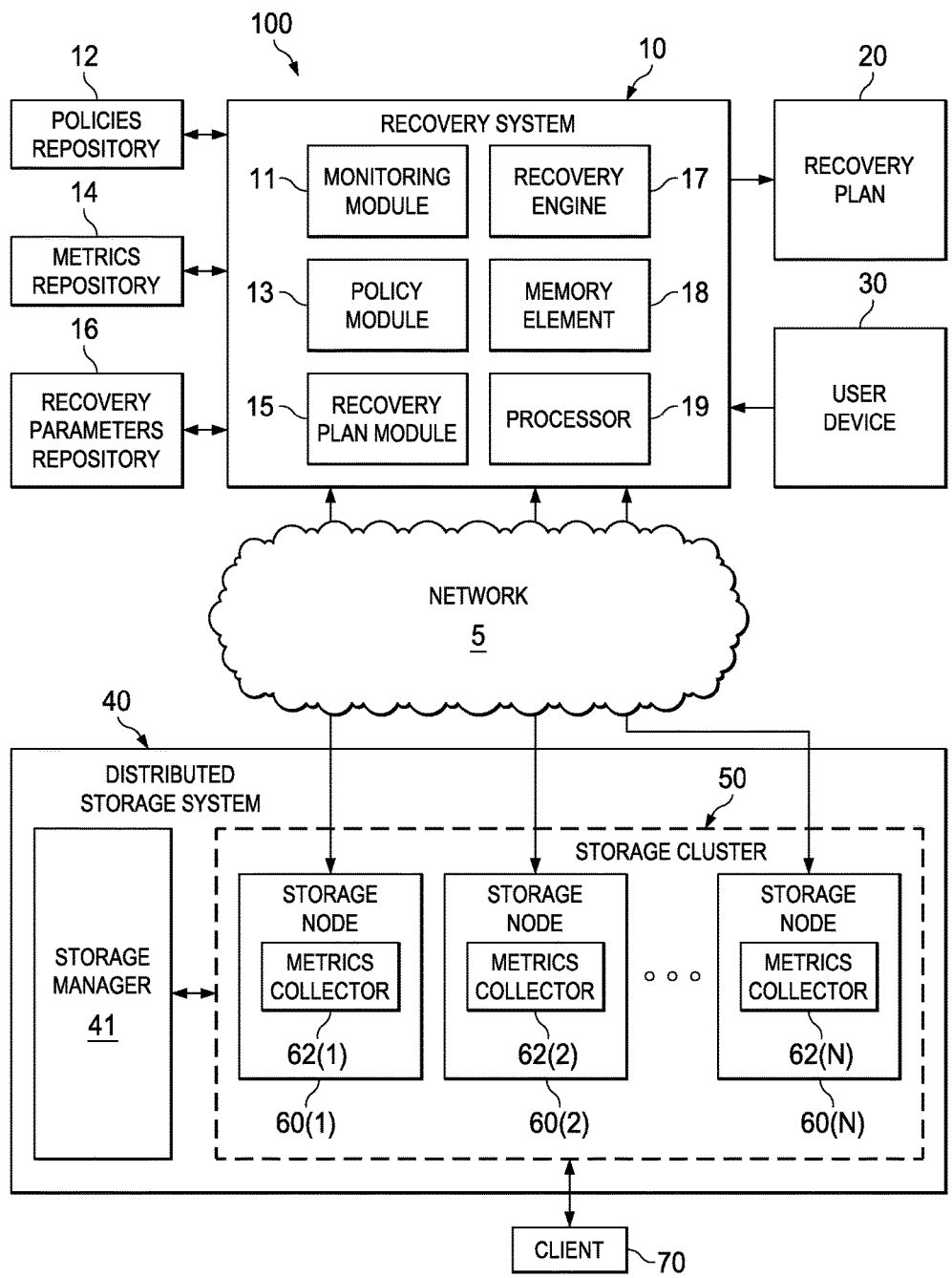
FIG. 1 is a simplified block diagram of a network environment including a recovery system for a distributed data storage system according to at least one embodiment.

FIG. 1 is a simplified block diagram of an example network environment 100 comprising a recovery system 10 for optimizing recovery processes in a distributed storage system 40. Recovery system 10 can communicate with a plurality of storage nodes 60(1) through 60(N) in a storage cluster 50, via network 5. Each storage node can include a metrics collector 62(1) through 62(N), respectively, for providing real-time metrics associated with the storage nodes to recovery system 10. In at least one embodiment, recovery system 10 can include a monitoring module 11, a policy module 13, a recovery plan module 15, and a recovery engine 17. Recovery system 10 can also include at least one processor 19 and at least one memory element 18, along with any other suitable hardware to enable its intended functionality. Various repositories may be associated with recovery system 10, including, but not limited to, a policies repository 12, a metrics repository 14, and a recovery parameters repository 16. Recovery system 10 may include a user interface to enable communication with a user device 30, which may be operated by a user. When node failure occurs, recovery system 10 can generate a recovery plan 20.

Elements of FIG. 1 may be coupled to one another through one or more interfaces employing any suitable connections (wired or wireless), which provide viable pathways for network communications. Additionally, one or more of these elements of FIG. 1 may be combined, divided, or removed from the architecture based on particular configuration needs. Network environment 100 may include a configuration capable of transmission control protocol/internet protocol (TCP/IP) communications for the transmission and/or reception of packets in the network. Network environment 100 may also operate in conjunction with a user datagram protocol/IP (UDP/IP), any other suitable protocol, or any suitable combination thereof where appropriate and based on particular needs.

For purposes of illustrating the techniques of recovery system 10, it is important to understand the activities that may be present in network environment 100. The following foundational information may be viewed as a basis from which the present disclosure may be properly explained. Such information is offered for purposes of explanation only and, accordingly, should not be construed in any way to limit the broad scope of the present disclosure and its potential applications.

In recent years, distributed storage systems for objects have emerged to provide a scalable option for cloud storage with greater accessibility and protection of stored data. Object storage involves storing one or more chunks of data in an object. Each object can include metadata and a unique identifier. Distributed storage systems can also be applied to other types of data storage such as block storage and file storage, for example. In block storage data can be stored in blocks (or volumes), where each block acts as an individual hard drive. File storage is generally a hierarchical way of organizing files containing data such that an individual file can be located by a path to that file. Certain metadata describing a file and its contents is also typically stored in a file system. In distributed storage systems, multiple replicas of data in any suitable type of structure (e.g., objects, files, blocks) can be maintained in order to provide fault tolerance and high availability. Although embodiments herein may be described with reference to objects and distributed object storage, this is done for ease of illustration and it should be understood that these embodiments may also be applicable to other types of data storage structures (e.g., block, file) and distributed storage including, but not limited to file and block storage systems.

An example distributed storage system that provides high fault tolerance and availability includes Ceph, which is described by Sage A. Weil in the dissertation, "Ceph: Reliable, Scalable, and High-Performance Distributed Storage," University of California, Santa Cruz, December 2007. Ceph is open source software designed to provide object, block and file storage from a distributed storage cluster. The storage cluster can be comprised of storage nodes with one or more memory elements (e.g., disks) for storing data. Storage nodes are also referred to as object storage devices (OSDs), which can be physical or logical storage elements. Storage nodes generally include an object storage device (OSD) software or daemon, which actually stores data as objects on the storage nodes. Ceph OSD software typically stores data on a local file system including, but not limited to, a B-tree file system (Btrfs). At least one Ceph metadata server can be provided for a storage cluster to store metadata associated with the objects (e.g., inodes, directories, etc.). Ceph monitors are provided for monitoring active and failed storage nodes in the cluster. It should be understood that references herein to a 'distributed object storage system' and 'distributed storage system' are intended to include, but are not necessarily limited to Ceph.

Typically, storage node failure in one or more storage nodes of a distributed storage system, or a network partition failure, creates a significant risk of cascading failures in the storage system. When a failure is detected, recovery processes are initiated to copy (or remap) replicated data to another node in order to maintain a replication factor of the data that was lost due to the failed node or partition. When a large amount of data is lost during a failure, these recovery processes can consume significant system resources and can add a tremendous load to other running nodes in the cluster. In addition, the network may be choked. Consequently, the cluster may slow and the still active nodes in the cluster may have a higher risk of crashing during the period of recovery. If additional nodes fail, more recovery processes may be initiated, which adds yet further load to the remaining active nodes in the cluster.

In some cases, distributed systems may provide some optimizations for a recovery process. Optimizations may include an amount of data to be transferred, a resulting maintenance cost in terms of data transfer, bandwidth impact, or finding a set of optimal nodes to recover the lost data. In distributed storage systems such as Ceph, however, other optimizations of recovery processes are needed, at least in part, to enable a recovery operation to be scheduled in order to avoid extra load and to take into account user defined priorities.

In accordance with at least one embodiment of the present disclosure, the aforementioned issues associated with recovery processes of distributed storage systems can be resolved in network environment 100. Recovery system 10 of network environment 100 is configured to optimize the recovery process in a distributed storage system, such as Ceph, by taking into account a set of recovery parameters that impact both the client-side operations and the actual recovery operations. Recovery system 10 also allows priorities to be specified for each individual node and for owners of the data residing on those nodes. A smart recovery system, such as recovery system 10, can analyze real-time metrics of the whole cluster, apply policies if applicable, and produce a recovery plan that ensures all the data is replicated as many times as needed (e.g., according to a predefined replication factor). The recovery system may also prioritize the recovery of critical data. In at least one embodiment, values for recovery parameters can be generated based on real-time system metrics of storage node device characteristics. Additionally, certain users may have different priorities and therefore, may purchase different types of subscriptions for their data. Certain customer data may be given a higher priority during a recovery process based on the customer's subscription type or on the amount of replication of the lost data in remaining active storage. For example, data that is minimally replicated (e.g., 1 replica remaining) may be given a higher priority.

Several advantages can be achieved by offering a recovery system for a distributed storage system in which recovery operations are controlled by automatically configuring recovery parameters (e.g., to manage load from recovery operations) and by injecting user defined policies to prioritize the recovery process. Embodiments disclosed herein provide a mechanism to ensure that cascading failures are averted during the recovery process and that client-side read/write operations are not impacted (or at least minimally impacted) by the recovery process. Thus, performance guarantees to an end user may continue to be satisfied even when a storage node or partition in the system fails. Embodiments can also accommodate tenant-specific behavior in a recovery process by prioritizing the recovery of data based on the policies assigned to the tenants (e.g., subscription policy). Embodiments enable the recovery of the most critical data to be prioritized in terms of tenant-defined priority, data-defined priority, and/or of minimally replicated data.

It should be noted that, as used herein, 'customer' and 'tenant' may be used interchangeably to refer to an entity that is associated with certain data stored in a distributed storage system. Such association with the stored data may be in the form of ownership, management, control, etc. of that data, including objects, files, blocks, etc. Generally, each object, block or file stored in a distributed storage system is associated with a single tenant. Multiple tenants may have data stored in the distributed storage system.

Turning to the infrastructure of FIG. 1, FIG. 1 is a simplified block diagram including distributed storage system 40 connected via network 5 to recovery system 10 in network environment 100. Network 5 represents a series of points or nodes of interconnected communication paths for receiving and transmitting packets of information that propagate through network environment 100. Network 5 offers a communicative interface between nodes (e.g., storage nodes 60(1)-60(N)) and recovery system 10, and may include any type or topology of one or more networks such as a local area network (LAN), wireless local area network (WLAN), metropolitan area network (MAN), virtual local area network (VLAN), Intranet, Extranet, wide area network (WAN) such as the Internet, virtual private network (VPN), any other appropriate network configuration, or any suitable combination thereof that facilitates communications in network environment 100. In at least some embodiments, other elements in network environment 100 may also communicate via one or more networks such as those described with reference to network 5. For ease of illustration, however, not all elements of FIG. 1 are depicted with communication lines traversing network 5 (e.g., client 70, storage manager 41, policies repository 12, metrics repository 14, recovery parameters repository 16, user device 30, etc.).

In network 5, network traffic, which is inclusive of packets, frames, signals, cells, datagrams, protocol data units (PDUs), data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). A packet is a unit of data for communicating information in a network, and can be routed between a source node (e.g., recovery system 10) and a destination node (e.g., storage nodes 60(1)-60(N)) via network 5. A packet includes, but is not limited to, a source network address, a destination network address, and a payload containing the information to be communicated. By way of example, these network addresses can be Internet Protocol (IP) addresses in a TCP/IP messaging protocol. Information is generally represented by data and, as used herein, 'data' refers to any type of binary, numeric, voice, video, media, textual, or script data, or any type of source or object code, or any other suitable information in any appropriate format that may be communicated from one point to another in electronic devices and/or networks.

Storage nodes 60(1)-60(N) include physical or logical storage elements with one or more disks for storing electronic data. In embodiments disclosed herein, data is stored in storage nodes 60(1)-60(N). For object storage, each object may have a unique identifier and associated metadata. Storage device software may be provided in each storage node to determine storage locations for data, to store the data, and to provide access to the data over the network. Data in storage nodes 60(1)-60(N) can be accessed by clients, such as client 70, by an application programming interface (API) or hypertext transfer protocol (HTTP), for example. Client 70 can enable users and/or applications to access the data.

As shown in FIG. 1, storage manager 41 may be provided in distributed storage system 40 to manage storage cluster 50. In Ceph, for example, storage manager 41 may include a metadata server to store metadata associated with objects in the storage nodes, and a Ceph monitor to store cluster membership, configuration and state. In addition, Ceph uses a Controlled Replication Under Scalable Hashing (CRUSH) algorithm to determine how to store and retrieve data by computing data storage locations. CRUSH creates a map of the cluster and the CRUSH map is used to store and retrieve data in storage nodes 60(1)-60(N). The map contains a list of rules that tells CRUSH how it should replicate data in a Ceph cluster's pool. The rules can contain a replication factor for a particular pool of data to determine how many times the data is to be replicated within the cluster and on which storage nodes the replicated data is to be stored. A pool can be a collection of objects (or other data structure) and a replication factor can be assigned to each pool.

In at least one embodiment, each storage node 60(1)-60(N) can include a corresponding metrics collector 62(1)-62(N), respectively. Metrics collectors 62(1)-62(N) can be configured to push system metrics of storage nodes 60(1)-60(N) to recovery system 10. System metrics can include information related to current system activity including, but not limited to, on-going client operations, current central processing unit (CPU) utilization, disk usage or load on the storage nodes, available network bandwidth, remaining disk input/output operations per second (IOPS), remaining disk bandwidth, etc. In at least one embodiment, these system metrics can be pushed to the recovery system by the metrics collectors in real-time. Recovery system 10 may store the system metrics in metrics repository 14, which may be internal to recovery system 10 or external (entirely or in part). In other embodiments, metrics collectors 62(1)-62(N) may store real-time system metrics in metrics repository 14 without accessing recovery system 10.

Recovery system 10 can be implemented as one or more network elements in network environment 100. As used herein, the term 'network element' is meant to encompass servers, processors, modules, routers, switches, gateways, bridges, load balancers, firewalls, inline service nodes, proxies, or any other suitable device, component, element, or proprietary appliance operable to exchange information in a network environment. This network element may include any suitable hardware, software, components, modules, or interfaces that facilitate the operations thereof. This may be inclusive of appropriate algorithms and communication protocols that allow for the effective exchange of data or information.

In one implementation, recovery system 10 includes software to achieve (or to foster) optimizing a recovery process for a distributed storage system, as outlined herein. Note that in one example, recovery system 10 can have an internal structure (e.g., processor 19, memory element 18, network interface card, etc.) to facilitate some of the operations described herein. In other embodiments, these optimization activities may be executed externally to recovery system 10, or included in some other network element to achieve this intended functionality. Alternatively, recovery system 10 may include this software (or reciprocating software) that can coordinate with other network elements in order to achieve the operations, as outlined herein. In still other embodiments, one or several devices may include any suitable algorithms, hardware, software, firmware, components, modules or interfaces that facilitate the operations thereof.

Recovery system 10 can include several components, which may be combined or divided in any suitable way, to achieve the recovery process optimization activities disclosed herein. Monitoring module 11 can be configured to monitor storage nodes 60(1)-60(N) and system metrics. In at least one embodiment, monitoring can occur continuously, in real-time. In at least one embodiment, monitoring module 11 detects when one or more of the storage nodes fail. A storage node (or a partition thereof) may be determined to have failed when the storage node, a disk of the storage node, or a disk partition of the storage node crashes, loses data, stops communicating, or otherwise ceases to operate. Also, in at least some embodiments, monitoring module 11 monitors system metrics in order to detect an impending failure of one or more storage nodes (or partitions thereof). For example, certain system metrics may indicate that a particular storage node is likely to fail (e.g., excessive disk usage, minimal disk IOPS, low network bandwidth, high CPU utilization, etc.) or that performance is unacceptably low. One or more of the system metrics, or a particular combination of the system metrics, may indicate impending failure of a storage node based on thresholds, ranges, or any other suitable measure.

Policy module 13 can provide or interact with a user interface to enable policies to be configured for tenants of distributed storage system 40. In at least one embodiment, a user interface may be configured to enable a user (e.g., an IT administrator) to configure, delete, update/modify, and access policies. Policy module 13 may store configured policies in policies repository 12.

In at least one embodiment, policies can indicate tenant priority, data priority, or any suitable combination thereof. Tenants of a distributed storage system may be assigned the same or different priorities. In at least one embodiment, policies related to tenant priority may be configured by associating a subscription with each tenant. For example, a tenant having a subscription type as a 'premium customer' may be given the highest priority for recovery when a failure occurs involving the tenant's data. Data from high priority tenants can be recovered first to ensure quality of service. Any number of different subscription types may be offered to tenants of the distributed storage system. Accordingly, any number of different priorities may be assigned to a tenant, according to their selected subscription type. In at least one embodiment, policies related to data priority may be configured based on how many times data is replicated in the cluster. For example, data that is minimally replicated (e.g., 1 replica on an active node) may be assigned a higher priority than other data having a greater number of replicas in the cluster.

By way of example, but not of limitation, an example scenario of priorities assigned to tenants A, B, C, D, and E, according to subscription type and data priority, is provided:
1. Priority 1: Tenants A, C, and E (premium subscription).
2. Priority 2: Tenants B and D (silver subscription).
3. Replicate data with 1 replica left, first.

Recovery plan module 15 can be configured to generate a recovery plan (e.g., recovery plan 20) based on recovery parameters, policies, or a combination thereof. Recovery plan module 15 may automatically generate recovery parameters based on real-time system metrics. Real-time system metrics can be obtained from metrics repository 14 in at least one embodiment. Examples of recovery parameters may include a recovery operation priority parameter (Osd_recovery_op_priority), a client operation priority parameter (Osd_client_op_priority), a recovery threads parameter (Osd_recovery_threads), and a recovery maximum active parameter (Osd_recovery_max_active). These parameters (and others) can be generated as a function of current activity including, but not limited to, client operations, current CPU utilization, disk usage, remaining disk IOPS, and remaining network bandwidth. The parameters may be generated each time a recovery plan is to be generated. In at least one embodiment, recovery plans may be generated after a system failure (e.g., a storage node crashes). Also, in at least some embodiments, recovery plans may be generated preemptively when the recovery system detects that a system failure is likely to occur or that performance is unacceptably low. By changing the recovery parameters in real-time when a recovery plan is generated, client and recovery operations can be balanced based on ongoing system activity.

The recovery operation priority parameter (Osd_recovery_op_priority) defines the priority for recovery operations. If the priority of a recovery operation is set to 'high', normal client operations may be blocked as the recovery operation takes precedence. The client operation priority parameter (Osd_client_op_priority) defines the priority for client operations, which is related to the recovery operation priority parameter. For example, if the client operation priority parameter is set to 'high', then some recovery operations may be blocked or delayed until client operations have finished. Thus, if the client operation priority parameter is set to 'high', then the recovery operation priority parameter may be set to 'low', and vice versa. Additionally, in some instances these parameters may be equal, causing the recovery operations and the client operations to have the same priority.

The recovery threads parameter (Osd_recovery_threads) defines a maximum number of parallel recovery threads that can run during a recovery process. For example, assume data of Tenant A has a replication factor of three and is stored on storage nodes 60(1), 60(2), and 60(3). If storage node 60(1) fails, data that was stored on storage node 60(1) can be recovered by remapping or copying the data from an active storage node that contains the same data (e.g., storage nodes 60(2) and 60(3)) to a new storage node. In this example, the data on storage nodes 60(2) and 60(3) may be referred to as 'replicas' or 'object replicas'. Multiple parallel threads can run to cause the remapping of data from the active storage nodes. Multiple parallel threads could affect different data on the same node or different data on different nodes. The recovery threads parameter defines the maximum number of threads associated with a recovery process that can be running in parallel in the system to recover data from any storage node.

The recovery maximum active parameter (Osd_recovery_max_active) defines the number of active recovery requests per storage node at one time. When recovery engine 17 initiates a recovery process, which can be based on a recovery plan, multiple requests to copy data from a particular storage node may be made. These requests generate active recovery threads. For example, if storage node 60(1) fails, and storage node 60(2) is a replica of storage node 60(1), then based on the recovery plan, the recovery process may trigger a request to copy some of the data (e.g., 100 objects) from storage node 60(2) to a new storage node. This request generates a recovery active thread. However, the recovery plan can cause the recovery process to make multiple requests to the same storage node, which can generate multiple active threads that affect different data from the storage node. More requests can accelerate recovery, but the requests may place an increased load on the cluster. The recovery maximum active parameter can help manage performance of the cluster during the recovery process by limiting the number of active recovery requests made to a single storage node at one time.

Recovery plan module 15 can also identify policies associated with data on a failed node. For example, if a failed node includes data associated with Tenants A, B, and C, then recovery plan module 15 can identify a subscription type assigned to each tenant. Other policies may also be identified such as, for example, data replica count based policies or any other policies that indicate which data to recover first. Recovery plan module 15 can determine an appropriate recovery order for the data to be recovered based on the identified policies and on the generated recovery parameters. A recovery plan (e.g., recovery plan 20) can be generated according to the recovery order.

Recovery engine 17 can initiate a recovery process based on a recovery plan to recover data on a failed node. In at least one embodiment, the recovery plan can be executed to initiate the recovery process. Requests are made by the recovery process to copy data from one or more active nodes to a new node, where the active nodes contain replicas of data that was stored on the failed node. In at least one embodiment, when a request is made to an active storage node (e.g., copy 100 objects from storage node 60(2) to the new node), the active storage node itself may perform the actual copy operations to copy the requested data to the new node.

Policies repository 12, metrics repository 14, and recovery parameters repository 16 may be provided in any suitable type of storage, which may be internal to recovery system 10 or external (entirely or in part). Internal storage could include any internal memory of recovery system 10, such as static storage, random access memory (RAM), or cache, for example. External storage could include a network storage technique such as network attached storage (NAS) or storage area network (SAN), or memory of another network element.

User device 30 can be any device capable of initiating communication in network environment 100 to access recovery system 10. For example, a user may configure tenant policies (e.g., subscription type, replica based policies, etc.) via user device 30. Client 70 can be associated with initiating communication in network environment 100 to access (e.g., read, write, copy, etc.) data in one or more storage nodes 60(1)-60(N). The terms 'user device' and 'client' are inclusive of devices used to initiate a communication, such as a computer, set-top box, IRD, telephone, client, server, VoIP phone, video phone, laptop, desktop computer, personal computer, mobile device, source node, destination node, or any other computing device, component, or element capable of initiating voice, audio, video, media, or data exchanges within network environment 100. User device 30 and client 70 may also be inclusive of a suitable interface to a human user, such as a display, a keyboard, a touchpad, a remote control, or other terminal equipment. User device 30 and client 70 may also be any device that seeks to initiate a communication on behalf of another entity or element, such as a program, a database, or any other component, module, device, or element capable of communication within network environment 100.

Figure 2:
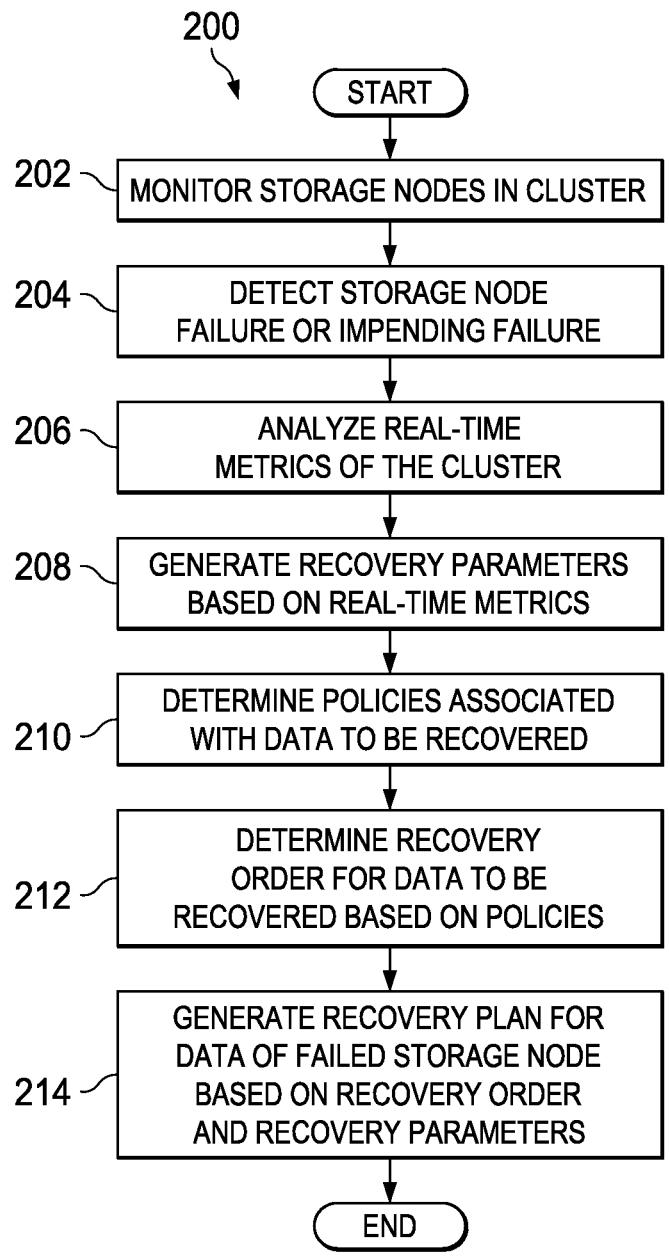
FIG. 2 shows a simplified flowchart illustrating possible activities associated with the recovery system according to at least one embodiment.

Turning to FIG. 2, FIG. 2 is a simplified flowchart 200 illustrating potential operations that may be associated with at least one embodiment described herein. In at least one embodiment, one or more sets of operations correspond to activities of FIG. 2. Recovery system 10 may comprise means such as one or more processors (e.g., processor 19), for performing the operations. In one example, at least some operations associated with flowchart 200 may be performed by monitoring module 11, by recovery plan module 15, and/or by recovery engine 17 when executed by one or more processors such as processor 19. For ease of reference, operations of flowchart 200 may be described without specific reference to particular modules or engines of recovery system 10.

At 202, recovery system 10 monitors storage nodes in a cluster of a distributed storage system. At 204, recovery system 10 detects the failure of one or more storage nodes, or detects impending failure of one or more storage nodes in the cluster based on real-time system metrics. It should be appreciated that detecting failure or impending failure of a storage node includes detecting failure or impending failure of the entire storage node, of one or more disks in the storage node, or of one or more disk partitions in the storage node. Real-time system metrics may be pushed to metrics repository 14 by the storage nodes. At 206, recovery system 10 can analyze the real-time system metrics from metrics repository 14.

At 208, recovery parameters can be generated based on the analysis of the real-time system metrics, which indicate characteristics of the cluster nodes and ongoing system activity. As previously described herein, recovery parameters can include a recovery operation priority parameter, a client operation priority parameter, a recovery threads parameter, a recovery maximum active parameter, and possibly others. The recovery parameters can be used to realize how a recovery process is to be executed.

At 210, recovery system 10 can identify policies associated with the data to be recovered. The policies may be identified from policies stored in policies repository 12, which have been configured by a user (e.g., IT Administrator). At 212, these identified policies can be used to determine a recovery order for data from the failed node or nodes to be recovered. The recovery order can be based on policies in terms of data priority, tenant priority, data replica count based policies, or any other policies that could determine which data to recover first.

In one example, a policy could be related to a subscription type assigned to a tenant of the data to be recovered. In some scenarios, multiple tenants may have data stored on a failed node. Accordingly, a subscription may be assigned to each tenant and, therefore, recovery system 10 can identify each subscription type associated with the data to be recovered. For example, if Tenant A has 1000 objects stored on a failed storage node, and Tenant B has 2000 objects stored on the same failed storage node, recovery system 10 can identify the subscription type assigned to Tenant A and the subscription type assigned to Tenant B. If the subscription type assigned to Tenant A has a higher priority than the subscription type assigned to Tenant B, then the recovery order can indicate that the 1000 objects associated with Tenant A are to be recovered first. Other policies associated with the data to be recovered can also be identified. For example, data replica count based policies could be identified, which can indicate that a higher priority is to be given to any data that is minimally replicated in the cluster (e.g., 1 replica remaining), or to prioritize sets of data based on how many replicas for each set exist in an active storage node in the cluster. In one example, the recovery order may indicate that any objects having only one replica remaining in the cluster are to be recovered before other objects have more than replica remaining in the cluster. In another example, the recovery order may indicate that objects having only two replicas remaining in the cluster are to be recovered before other objects having three replicas in the cluster, but after objects having only one replica in the cluster.

At 214, recovery system 10 can generate a recovery plan for the data of the failed storage node, based on the recovery order and the recovery parameters. The recovery order can be used to configure the order of recovering the data, and the recovery parameters can be used to configure how to perform the recovery process. In at least one embodiment, the recovery plan can be executed to initiate the recovery process.

Figure 3:
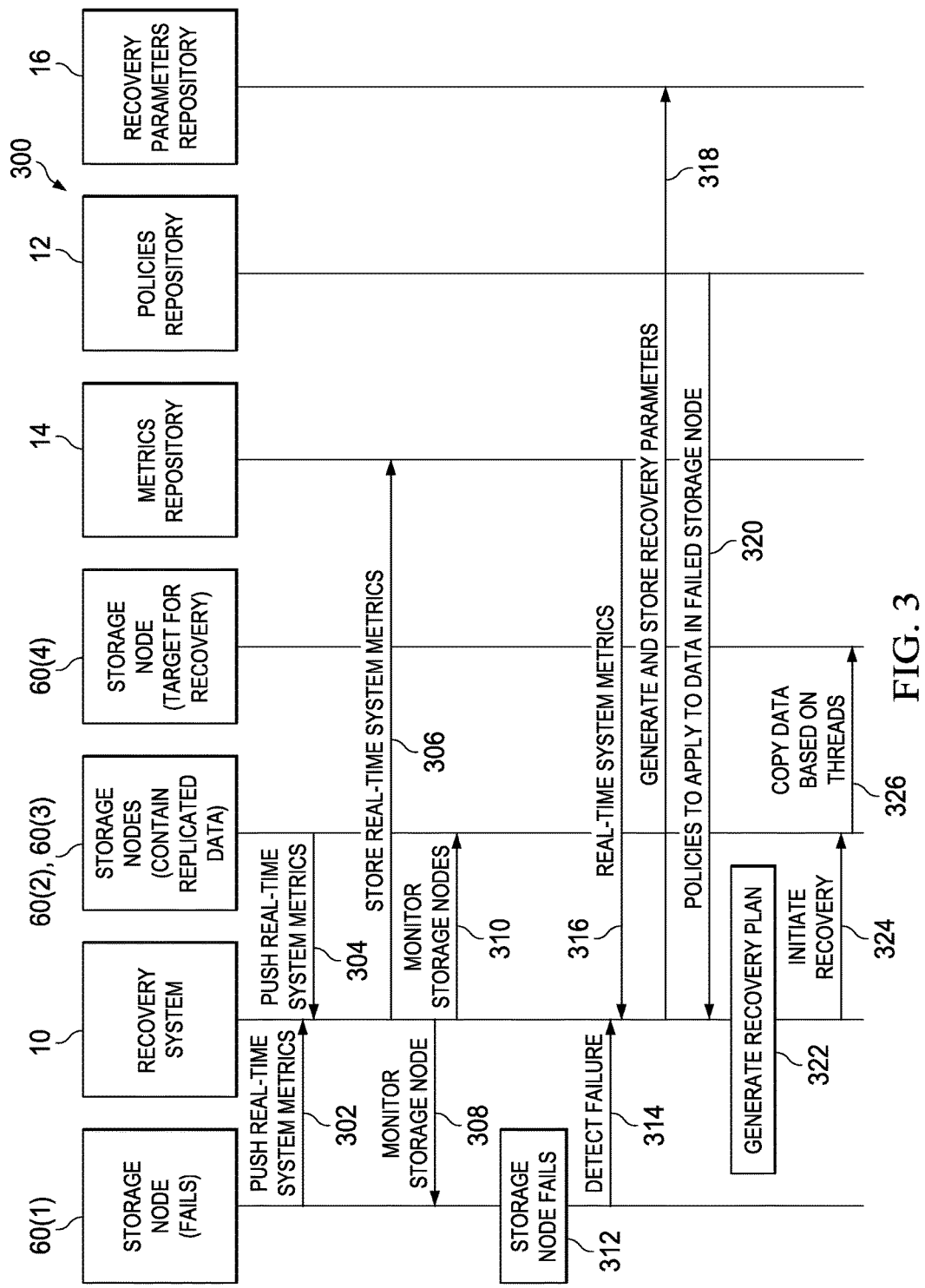
FIG. 3 is a simplified interaction diagram illustrating possible interactions between several elements in the network environment according to at least one embodiment.

Turning to FIG. 3, a simplified interaction diagram illustrates possible interactions that may occur in network environment 100 in an example scenario between recovery system 10, storage nodes 60(1)-60(4), policies repository 12, metrics repository 14, and recovery parameters repository 16. The example of FIG. 3 is merely an example of potential interactions, and does not limit the scope of the claims. For example, number of modules may vary, number of components may vary, specific interactions may vary, order of interactions may vary, etc. In the example scenario depicted in FIG. 3, storage node 60(1) experiences failure. For simplicity, it is assumed that all of the data on storage node 60(1) has the same replication factor of 3 and all of the data on storage node 60(1) was lost due to the failure. Storage nodes 60(2) and 60(3) each contain replicas of all of the data that was stored on storage node 60(1). Also, storage node 60(4) is the target (new) node for the recovery process in this example scenario.

At 302 and 304, real-time system metrics are pushed from storage nodes 60(1), 60(2) and 60(3) to recovery system 10. Although not shown in FIG. 3, other storage nodes in the cluster (including storage node 60(4)) may also be pushing system metrics to recovery system 10. These system metrics may be pushed continuously in real-time, or at any suitable intervals of time. At 306, recovery system 10 may store the system metrics in metrics repository 14. As previously described herein, metrics repository may be integrated with recovery system 10 or separated (in whole or in part). Also, in at least one other embodiment, the storage nodes could push system metrics directly to metrics repository 14.

At 308 and 310, recovery system 10 can monitor storage nodes 60(1), 60(2), and 60(3). Although not shown in FIG. 3, recovery system 10 can also monitor the other storage nodes in the cluster. Recovery system 10 can monitor the storage nodes in order to detect failures. In at least some embodiment, recovery system 10 may also monitor the storage nodes and/or the system metrics being pushed by the storage nodes to assess whether there is an impending failure, even if an actual node (or partition) failure has not occurred.

In this example scenario, storage node 60(1) fails at 312. Recovery system 10 detects the failure at 314. In another scenario, storage node 60(1) may detect impending failure before storage node 60(1) actually fails. Once failure has been detected, at 316, recovery system 10 obtains the real-time system metrics from metrics repository 14. The real-time system metrics can be the most recent system metrics received from storage nodes in the cluster. At 318, recovery system 10 can generate recovery parameters based on the real-time system metrics. In at least one embodiment, the generated recovery parameters may be stored in recovery parameters repository 16.

At 320, recovery system 10 identifies policies associated with data stored in failed storage node 60(1). These identified policies can include, but are not limited to, data priority, tenant priority, data replica count, or any combination thereof. A recovery order can be generated, based on the identified policies, to indicate the order in which data on failed storage node 60(1) is to be recovered from other nodes containing the replicas of the data (e.g., storage nodes 60(2) and 60(3)).

At 322, recovery system 10 generates a recovery plan based on the recovery parameters and the recovery order. The recovery plan can contain multiple requests for storage nodes 60(2) and 60(3) to copy certain data to storage node 60(4). The recovery plan can be executed at 324, to initiate a recovery process. During the recovery process, requests to copy certain data (e.g., objects 1-100, objects 101-200, etc.) can cause new recovery threads to run and data can be copied based on the particular threads. Once a request is made, a particular node indicated in the request (e.g., storage node 60(2) or 60(3)) copies the identified data from itself to the target storage node 60(4). Thus, at 326, data is copied from storage nodes 60(2) and/or 60(3) to target storage node 60(4), based on the recovery threads. When the recovery process finishes, a replica of the data stored in storage node 60(1) is stored in target storage node 60(4) and the stored data in storage nodes 60(2), 60(3), and 60(4) satisfies the replication factor of three.

Note that, as used herein, unless expressly stated to the contrary, use of the phrase 'at least one of' refers to any combination of the named items, elements, conditions, activities, etc. For example, 'at least one of X, Y, and Z' is intended to mean any of the following: 1) one or more X's, but not Y and not Z; 2) one or more Y's, but not X and not Z; 3) one or more Z's, but not X and not Y; 4) one or more X's and one or more Y's, but not Z; 5) one or more X's and one or more Z's, but not Y; 6) one or more Y's and one or more Z's, but not X; or 7) one or more X's, one or more Y's, and one or more Z's.

Furthermore, it should be appreciated that the words "optimal," "optimize," "optimization," and related terms are terms of art that refer to improvements in speed, efficiency and/or accuracy of a specified outcome and do not purport to indicate that a process for achieving the specified outcome has achieved, or is capable of achieving, an "optimal" or perfectly speedy/perfectly efficient state or outcome.

In certain example implementations the recovery functions outlined herein may be implemented by logic encoded in one or more machine readable storage media (e.g., embedded logic provided in an application specific integrated circuit (ASIC), digital signal processor (DSP) instructions, software (potentially inclusive of object code and source code) to be executed by a processor or other similar machine, etc.). In some of these instances, a memory element (as shown in FIG. 1) can store data used for the operations described herein. This includes the memory element being able to store software, logic, code, or processor instructions that are executed to carry out the activities described in this Specification. A processor can execute any type of instructions associated with the data to achieve the operations detailed herein. In one example, the processor (as shown in FIG. 1) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)) or an ASIC that includes digital logic, software, code, electronic instructions, or any suitable combination thereof.

In one example implementation, recovery system 10 may include software in order to achieve the recovery functions outlined herein. These activities can be facilitated by monitoring module 11, policy module 13, recovery plan module 15, and recovery engine 17 (where the functionality of these modules and engines can be suitably combined or separated in any appropriate manner, which may be based on particular configuration and/or provisioning needs). Recovery system 10 can include memory elements for storing information to be used in achieving the recovery activities, as discussed herein. Additionally, recovery system 10 may include one or more processors (e.g., processor 19) that can execute software or an algorithm to perform the recovery operations, as disclosed in this Specification. These devices may further keep information in any suitable memory elements (e.g., random access memory (RAM), read only memory (ROM), EPROM, EEPROM, ASIC, etc.), software, hardware, or in any other suitable component, device, element or object where appropriate and based on particular needs. Any of the memory items discussed herein (e.g., database, tables, trees, cache, file, repository, etc.) should be construed as being encompassed within the broad term 'memory element.' Similarly, any of the potential processing elements, modules, machines, and engines described in this Specification should be construed as being encompassed within the broad term 'processor.' Recovery system 10 can also include suitable interfaces (e.g., network interface card) for receiving, transmitting, and/or otherwise communicating data or information in network environment 100.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of operations by only referencing a limited number of network elements and nodes. It should be appreciated that recovery system 10 (and its teachings) is readily scalable and can accommodate a large number of components, as well as more complicated/sophisticated arrangements and configurations. Accordingly, the examples provided should not limit the scope or inhibit the broad teachings of recovery system 10 as potentially applied to a myriad of other architectures.

Although the present disclosure has been described in detail with reference to particular arrangements and configurations, these example configurations and arrangements may be changed significantly without departing from the scope of the present disclosure. For example, although the present disclosure has been described with reference to particular recovery activities applied to a Ceph storage system, recovery system 10 may be applicable to other distributed storage systems.

Finally, it is also important to note that the operations in the preceding flowchart and interaction diagram illustrate only some of the possible scenarios and patterns that may be executed in association with recovery operations for a distributed storage system. Some of these operations may be deleted, removed, combined, or divided where appropriate, or may be modified or changed considerably without departing from the scope of the present disclosure. In addition, a number of these operations have been described as being executed before, after, concurrently with, or in parallel to, one or more additional operations. However, the timing of these operations may be altered considerably. The preceding operational flows have been offered for purposes of example and discussion. Network environment 100, including recovery system 10, may provide substantial flexibility in that any suitable arrangements, chronologies, configurations, and timing mechanisms may be provided without departing from the teachings of the present disclosure.

What is claimed is:

1. A method comprising:
obtaining at least one system metric of a distributed storage system;
detecting, by at least one hardware processor of a recovery system, a failure of a storage node of a plurality of storage nodes in the distributed storage system;
generating, by the at least one hardware processor of the recovery system, two or more recovery parameters based on the at least one system metric, wherein the two or more recovery parameters comprise a recovery operation priority parameter that defines a priority for performing recovery operations of a recovery process based on the failure of the storage node and a client operation priority parameter that defines a priority for performing client operations during the recovery process;
identifying at least one policy associated with data stored in the storage node; and
generating a recovery plan for the data based on the two or more recovery parameters and the at least one policy;
wherein the recovery plan is to cause a first subset of the data to be replicated before a second subset of the data based on the first subset of the data being associated with a first replication factor that is smaller than a second replication factor associated with the second subset of the data;
wherein the first replication factor indicates a number of times the first subset is to be replicated in the plurality of storage nodes, and wherein the second replication factor indicates a number of times the second subset is to be replicated in the plurality of storage nodes.

2. The method of claim 1, wherein the at least one system metric includes information related to at least one of on-going client operations, current central processing unit (CPU) utilization, disk usage, available network bandwidth, remaining disk input/output operations per second (IOPS), and remaining disk bandwidth.

3. The method of claim 1, wherein the at least one system metric is pushed, in real-time, to the recovery system from at least one storage node of the plurality of storage nodes in the distributed storage system.

4. The method of claim 1, further comprising:
monitoring the plurality of storage nodes in the distributed storage system for an indication of failure, wherein the recovery plan is generated for the data after the failure of the storage node is detected.

5. The method of claim 1, wherein the recovery plan includes a recovery order for recovering the data.

6. The method of claim 5, further comprising:
initiating the recovery process to copy one or more replicas of the data from one or more other storage nodes to a new storage node, wherein the one or more replicas are copied according to the recovery order indicated in the recovery plan.

7. The method of claim 1, wherein a first subset of the data associated with a first policy is recovered before a second subset of the data associated with a second policy, wherein the first policy indicates a higher priority than the second policy.

8. At least one non-transitory machine readable storage medium comprising instructions stored therein, and when executed by at least one processor the instructions cause the at least one processor to:
obtain at least one system metric of a distributed storage system;
detect a failure of a storage node of a plurality of storage nodes in the distributed storage system;
generate two or more recovery parameters based on the at least one system metric, wherein the two or more recovery parameters comprise a recovery operation priority parameter that defines a priority for performing recovery operations of a recovery process based on the failure of the storage node and a client operation priority parameter that defines a priority for performing client operations during the recovery process;

identify at least one policy associated with data stored in the storage node; and generate a recovery plan for the data based on the two or more recovery parameters and the at least one policy;

wherein the recovery plan is to cause a first subset of the data to be replicated before a second subset of the data based on the first subset of the data being associated with a first replication factor that is smaller than a second replication factor associated with the second subset of the data;

wherein the first replication factor indicates a number of times the first subset is to be replicated in the plurality of storage nodes, and wherein the second replication factor indicates a number of times the second subset is to be replicated in the plurality of storage nodes.

9. The at least one non-transitory machine readable storage medium of claim 8, wherein the instructions when executed by the at least one processor cause the at least one processor to:

monitor the plurality of storage nodes in the distributed storage system for an indication of failure, wherein the recovery plan is generated for the data after the failure of the storage node is detected.

10. The at least one non-transitory machine readable storage medium of claim 8, wherein the recovery plan includes a recovery order for recovering the data.

11. The at least one non-transitory machine readable storage medium of claim 10, wherein the instructions when executed by the at least one processor cause the at least one processor to:

initiate the recovery process to copy one or more replicas of the data from one or more other storage nodes to a new storage node, wherein the one or more replicas are to be copied according to the recovery order indicated in the recovery plan.

12. The at least one non-transitory machine readable storage medium of claim 8, wherein a first subset of the data associated with a first policy of a first tenant is recovered before a second subset of the data associated with a second policy of a second tenant, wherein the first policy indicates a higher priority than the second policy.

13. The at least one non-transitory machine readable storage medium of claim 8, wherein the recovery plan prioritizes recovery of a first subset of the data if the first subset is not replicated in at least a threshold number of other storage nodes that are active.

14. The at least one non-transitory machine readable storage medium of claim 8, wherein the two or more recovery parameters are generated in real-time for the recovery plan and are based, at least in part, on a current system activity of the distributed storage system indicated by the at least one system metric.

15. An apparatus comprising:

at least one processor; and at least one memory element comprising instructions that when executed by the at least one processor cause the apparatus to:

obtain at least one system metric of a distributed storage system;

detect a failure of a storage node of a plurality of storage nodes in the distributed storage system;

generate two or more recovery parameters based on the at least one system metric, wherein the two or more recovery parameters comprise a recovery operation priority parameter that defines a priority for performing recovery operations of a recovery process based on the failure of the storage node and a client operation priority parameter that defines a priority for performing client operations during the recovery process;

identify at least one policy associated with data stored in the storage node; and generate a recovery plan for the data based on the two or more recovery parameters and the at least one policy;

wherein the recovery plan is to cause a first subset of the data to be replicated before a second subset of the data based on the first subset of the data being associated with a first replication factor that is smaller than a second replication factor associated with the second subset of the data;

wherein the first replication factor indicates a number of times the first subset is to be replicated in the plurality of storage nodes, and wherein the second replication factor indicates a number of times the second subset is to be replicated in the plurality of storage nodes.

16. The apparatus of claim 15, wherein the at least one system metric is pushed, in real-time, to a recovery system from at least one storage node of the plurality of storage nodes in the distributed storage system.

17. The apparatus of claim 15, wherein the recovery plan includes a recovery order for recovering the data.

18. The apparatus of claim 17, wherein the instructions when executed by the at least one processor cause the apparatus to:

initiate the recovery process to copy one or more replicas of the data from a second storage node to a new storage node, wherein the one or more replicas of the data are to be copied according to the recovery order indicated in the recovery plan.

* * * * *